US006275166B1

United States Patent
del Castillo et al.

(10) Patent No.: US 6,275,166 B1
(45) Date of Patent: Aug. 14, 2001

(54) RF REMOTE APPLIANCE CONTROL/MONITORING SYSTEM

(75) Inventors: Byron del Castillo; Diane L. Ginsburg, both of Ft. Lauderdale; Steven R. Parsons, Covina, all of FL (US); Robert C. Rosen, Tujunga, CA (US)

(73) Assignee: Architron Systems, Inc., Los Angeles, CA (US)

( * ) Notice: Subject to any disclaimer, the term of this patent is extended or adjusted under 35 U.S.C. 154(b) by 0 days.

(21) Appl. No.: 09/234,968

(22) Filed: Jan. 19, 1999

(51) Int. Cl.[7] .................................................. G05B 23/02
(52) U.S. Cl. .............................. 340/825.07; 340/825.44; 340/825.53; 340/825.73; 370/335; 370/342
(58) Field of Search ...................... 340/825.07, 825.44, 340/825.53, 825.73; 370/335, 342

(56) References Cited

U.S. PATENT DOCUMENTS

| 4,199,761 | 4/1980 | Whyte et al. . |
| 4,394,775 | 7/1983 | Bruinsma . |
| 4,901,307 | * 2/1990 | Gilhousen et al. ..................... 370/18 |
| 4,903,262 | 2/1990 | Dissosway et al. . |
| 5,021,794 | 6/1991 | Lawrence . |
| 5,087,099 | 2/1992 | Stolarczyk . |
| 5,265,150 | 11/1993 | Helmkamp et al. . |
| 5,364,024 | 11/1994 | Lin . |
| 5,390,206 | 2/1995 | Rein et al. . |
| 5,395,042 | 3/1995 | Riley et al. . |
| 5,398,257 | 3/1995 | Groenteman . |
| 5,440,301 | 8/1995 | Evans . |
| 5,475,364 | 12/1995 | Kenet . |
| 5,476,221 | 12/1995 | Seymour . |
| 5,526,376 | 6/1996 | Kellenberger et al. . |
| 5,745,849 | 4/1998 | Britton . |
| 5,790,938 | 8/1998 | Talarmo . |
| 5,892,758 | * 4/1999 | Argyroudis ........................ 370/335 |
| 6,060,996 | * 5/2000 | Kaiser et al. ................... 340/825.44 |

* cited by examiner

Primary Examiner—Michael Horabik
Assistant Examiner—William L Bangachon
(74) Attorney, Agent, or Firm—Sheldon & Mak

(57) ABSTRACT

A system for managing a distributed array of appliances includes a headend computer having a low power main transceiver and a distributed array of relay units. Each relay unit includes a low power satellite transceiver, a microcomputer connected to the satellite transceiver, the satellite transceiver being controlled by relay program instructions for detecting communications directed by the headend computer relative to the same relay unit and directing communications to the headend computer relative to the same relay unit, and for retransmitting communications to other relay units. At least some of the relay units are appliance controllers and include an appliance interface for communicating with the appliance, the microcomputer being also connected to the appliance interface and having program instructions for directing communication between the satellite transceiver and the appliance interface. Each of the relay units has a unique address associated therewith, occurrences of the unique address being detected in communications from the headend computer. Each of the transceivers has an effective range of not less than approximately 60 feet or more depending on the frequency, which can be between 66 KHz and 2.6 GHz. The transceiver can selectively operate on one of at least 16 carrier frequencies, or one of several spread spectrum channels. Also disclosed is a method for controlling a distributed array of appliances from the headend computer.

17 Claims, 3 Drawing Sheets

RF REMOTE APPLIANCE CONTROL/MONITORING SYSTEM

BACKGROUND

The present invention relates to environmental control and monitoring of buildings, and more particularly to systems for controlling and monitoring heating, air conditioning, lighting, security, occupancy, and usage of distributed facilities such as hotels and the like.

The control of distributed systems such as building systems has been undertaken in connection with commonly used computer networks and business software. See, for example, U.S. Pat. No. 4,212,078 to Games et al. A major difficulty with such systems is the expense of wiring interconnections between elements of the system, particularly when there are additions or changes to be made in the system. The expense of these interconnections can be reduced somewhat by the use of efficient network protocols, such as the widely known Ethernet standard that has a range of up to 1000 meters. Another recent development is the use of AC power wiring to transmit RF communications to remote controllers, such as disclosed in U.S. Pat. No. 4,429,299 to Kabat et al. A further development is control using a combination of wired and wireless communications as disclosed, for example, in U.S. Pat. Nos. 5,440,301 to Evans and 5,476,221 to Seymour.

Unfortunately, centralized wireless control systems for building appliances have not been widely utilized, largely because systems having sufficient range normally are subject to regulations and licensing requirements that are prohibitively expensive. Also, systems that are sufficiently powerful to be used in widely distributed installations are unnecessarily expensive in smaller installations. Further, there is limited availability of RF carrier frequencies, and potential interference with other nearby systems that might be operational.

Thus there is a need for a wireless appliance control system that overcomes the disadvantages of the prior

SUMMARY

The present invention meets this need by providing a wireless configuration that uses a distributed array of low power (short range) wireless controllers that are also functional as relay units for communicating with a headend control computer at long range. In one aspect of the invention, an appliance controller is provided for a distributed appliance system having a headend computer, a multiplicity of appliances, and a plurality of relay units, one of the relay units being the appliance controller. The appliance controller includes a low power satellite radio transceiver having a range being less than a distance to at least some of the appliances; an appliance interface for communicating with the at least one local appliance; a microcomputer connected between the satellite radio transceiver and the appliance interface and having first program instructions for controlling the satellite transceiver and second program instructions for directing communication between the satellite transceiver and the appliance interface. The first program instructions include detecting communications directed by the headend computer relative to the same appliance controller, signaling receipt of the directed communications, and directing communications to the headend computer relative to the same appliance controller. The second program instructions include detecting relay communications directed between the headend computer and a different relay unit, transmitting the relay communications, detecting a reply communication from the different relay unit, and transmitting the reply communication to the headend computer, wherein at least some of the relay units communicate with the headend computer by relay communications using at least two others of the relay units.

Preferably each of the relay units has a unique address, each communication from the headend computer to the appliance controller including an address code corresponding to the unique address being selectively a relay address for communications being relayed to other relay units, the address code being a destination address when the appliance controller is the destination of the communication, the appliance controller including means for decoding the address code. Thus any distribution of relay units having the unique addresses can be accessed from the headend computer, as long as there is a communication path to each appliance controller that does not have a segment larger than an effective range of the transceivers. Each of the transceivers can have an effective range to another of the relay units being not less than 50 feet and not more than 1 mile. The satellite radio transceiver can have a carrier frequency of between 66 KHz and 2.6 GHz. The carrier frequency can be selectively one of at least four frequencies.

In another aspect of the invention, a system for controlling a distributed array of appliances includes the headend computer having a low power main radio transceiver interfaced thereto, the main radio transceiver having a range being less than a distance to at least some of the appliances; and a distributed array of relay units, each relay unit including a low power satellite radio transceiver having a range being less than the distance to at least some of the appliances; a microcomputer connected to the satellite radio transceiver and relay program instructions for controlling the satellite transceiver; the relay program instructions including first instructions for detecting communications directed by the headend computer relative to the same relay unit and directing communications to the headend computer relative to the same relay unit, and second instructions for retransmitting communications to other relay units. At least some of the relay units are appliance controllers, each of the appliance controllers being located proximate at least one of the appliances and further including an appliance interface for communicating with the at least one appliance. The microcomputer is also connected to the appliance interface and having destination program instructions for directing communication between the satellite transceiver and the appliance interface, wherein at least some of the appliance controllers communicate with the headend computer by relay communications using at least two others of the relay units.

Preferably each of the relay units has the unique address, the means for detecting the unique address in received communications, each communication from the headend computer to an appliance controller including the destination address and selectively one or more of the relay addresses. Each of the transceivers can have an effective range of not less than 50 feet and not more than 1 mile to another of the transceivers.

Each of the transceivers can operate at a frequency of between 900 MHz and 1.0 GHz, having an effective range of not less than 50 feet and not greater than approximately 1000 feet. Each of the transceivers can operate at a frequency of between 2.4 GHz and 2.6 GHz, having an effective range of not less than 1,000 feet and not greater than approximately 1 mile. Each of the transceivers operates at a power not greater than 100 milliwatts. The satellite radio transceiver can have a carrier frequency of between 66 KHz and 2.6 GHz. The carrier frequency can be selectively one of at least four frequencies.

In a further aspect of the invention, a method for controlling a distributed array of appliances from a headend computer includes the steps of:

(a) providing a headend computer having a main radio transceiver;

(b) providing a distributed array of relay units, each relay unit having a satellite radio transceiver and a unique serial number, at least some of the relay units being electrically interfaced to a corresponding portion of the appliances;

(c) signaling by the main transmitter from the headend computer the addresses of at least three relay units, one of the addresses being a destination address, the other addresses including first and second relay addresses, and a control signal for an appliance being interfaced to a destination relay unit having a serial number corresponding to the destination address;

(d) decoding the first relay address at a first relay unit having a corresponding serial number;

(e) transmitting the control signal, the second relay address, and the destination address from the first relay unit;

(f) decoding the destination address at the destination relay unit; and (g) feeding the control signal to the appliance from the destination relay unit.

The method can further include the steps of:

(a) transmitting the destination address, the first and second relay addresses, and an acknowledgment signal from the destination relay unit;

(b) decoding the second relay address at the second relay unit;

(c) transmitting the acknowledgment signal, the first relay address, and the destination address from the second relay unit;

(d) decoding the destination address and receiving the acknowledgment signal at the headend computer.

DRAWINGS

These and other features, aspects, and advantages of the present invention will become better understood with reference to the following description, appended claims, and accompanying drawings, where:

DESCRIPTION

Figure 2:
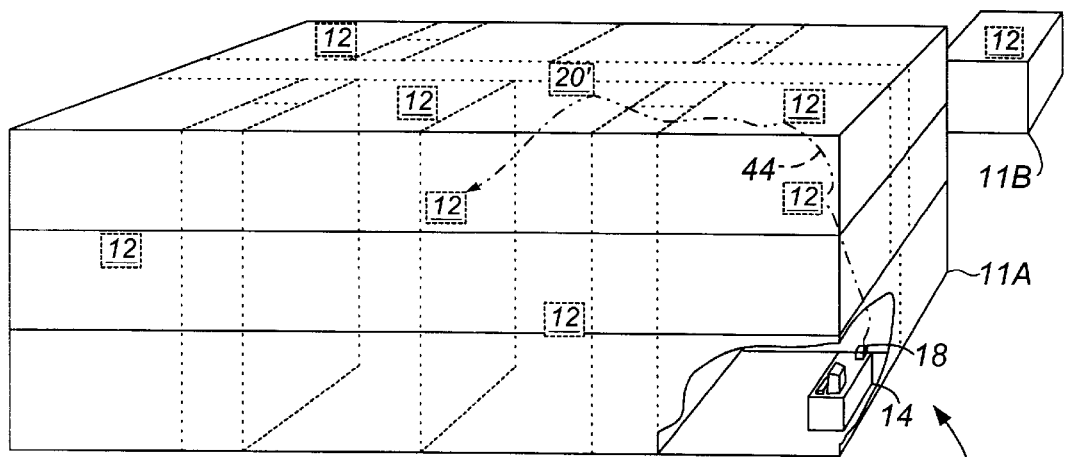
FIG. 2 is a perspective diagramic view of a building plant incorporating the system of FIG. 1.
Figure 1:
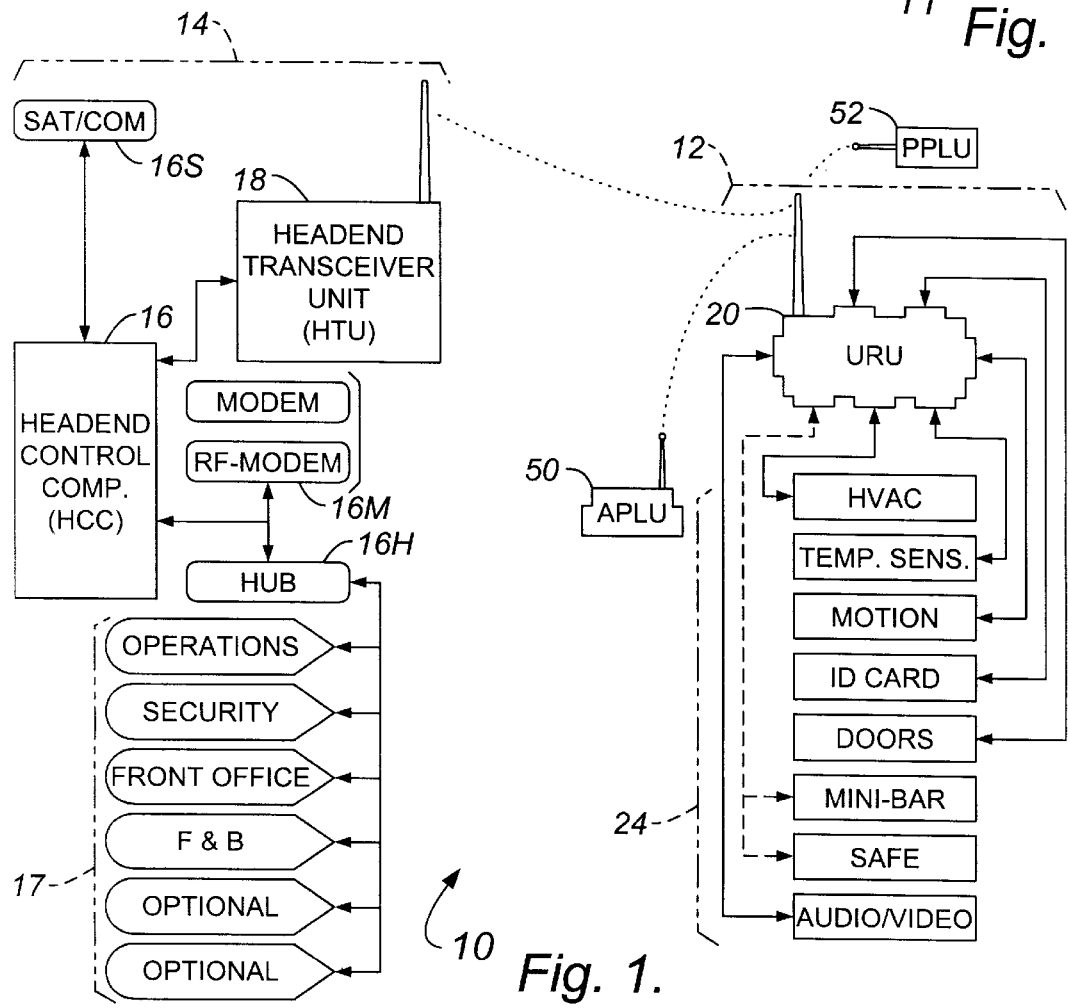
FIG. 1 is a pictorial diagram view of an appliance control system according to the present invention.
Figure 3:
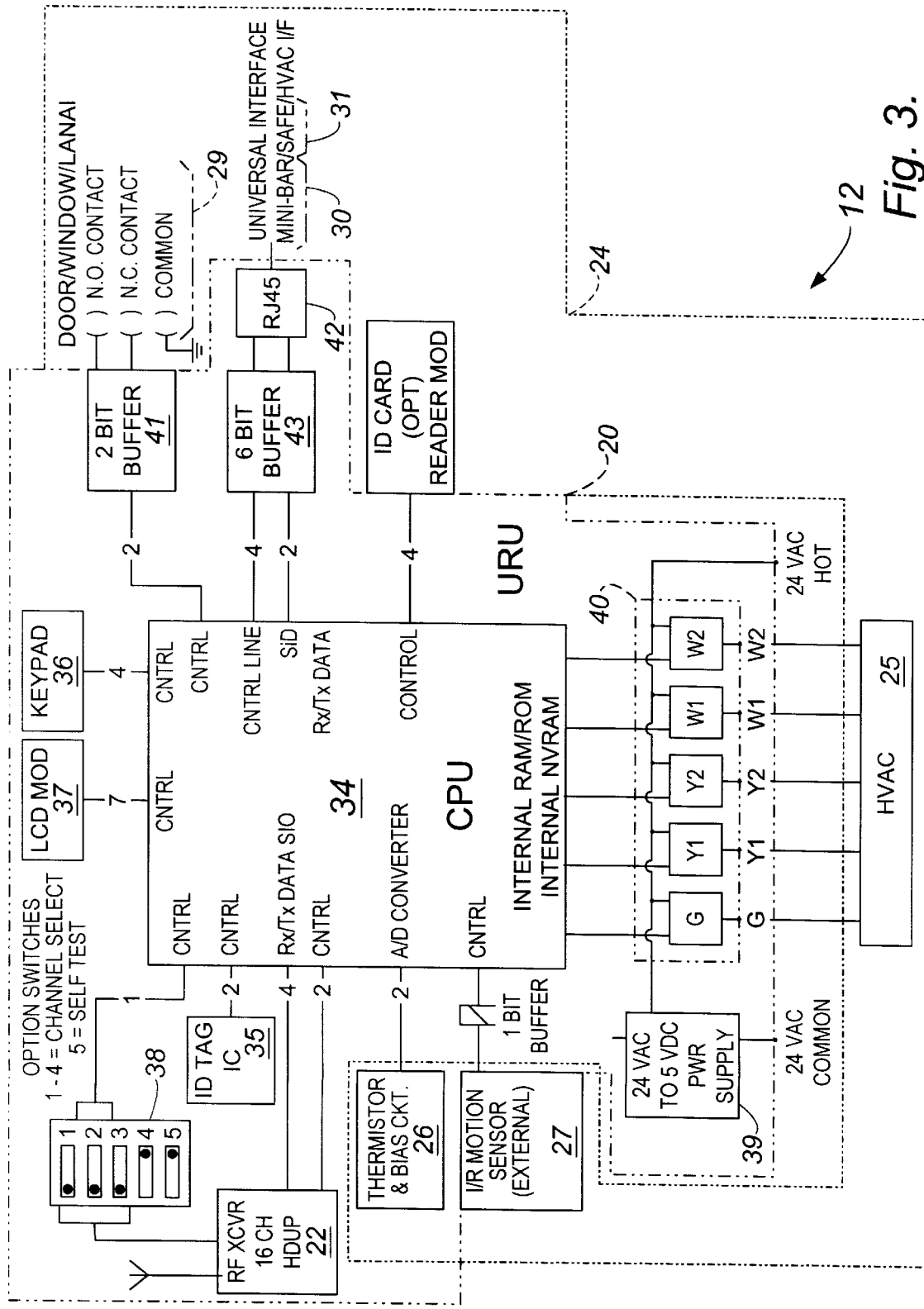
FIG. 3 is a simplified circuit block diagram of an appliance controller portion of the system of FIG. 1.

The present invention is directed to an appliance control/monitoring system that is particularly effective in a variety of building plant configurations. With reference to FIGS. 1–3 of the drawings, an appliance management system 10 for a building plant 11 includes a distributed array of appliance management stations (AMSs) 12 that have wireless communications with a headend control station (HCS) 14. The building plant 11 can be a service facility such as a hotel, motel, hospital, or shopping mall, a manufacturing facility, or any facility having a distributed array of appliances to be controlled and/or monitored. The HCS 14 includes a headend control computer (HCC) 16 that is typically interfaced to satellite terminals 17, the HCS 14 also including a headend transceiver unit (HTU) 18 for wireless communications with the AMSs 12. The HCC 16 typically includes a conventional network interface hub 16H for connecting the satellite terminals 17, and may also include a modem 16M for telephonic communications and/or a satellite communications link 16S. Computers suitable for use as the HCC 16 include those generally known as "personal computers", preferably having minimum specifications including an Intel Pentium® P2 processor, 128 MB RAM, 6 GB hard disk drive, 100 MB ZIP drive, 32X CDROM drive, four RS-232 I/O ports with a DB-9 interface, a USB mouse port, a keyboard port, a parallel printer port, a 100 BT network interface port, a 15-inch SVGA color monitor having 0.28 mm dot pitch, and a 600 dpi laser printer having a speed of 6 ppm, 110 key keyboard, and a Microsoft 3-button USB roller mouse.

The HTU 18 is an RF modem that converts an RS-232 serial ACSII data stream from the HCC 16 to FSK RF modem signals. The HTU 18 contains a data buffer that is maintained in a conventional manner by an on-board microcontroller to support full RS-232 handshaking with the serial port. Transmissions are at a frequency selected from within the 900 MHz band or the 2.4 GHz band. The HTU 18 can be one of a plurality of such devices when it is desired to operate the system 10 at multiple frequencies. This can be the case, for example, when a subset of the AMSs 12 is spaced at close range, such as within 50 or 60-foot intervals up to approximately 200 feet (to be operated in the 900 MHz band), and another subset is more remotely spaced, such as within 1000-foot or up to approximately 1 mile intervals (to be operated in the 2.4 GHz band). Thus the system 10 provides high bandwidth capabilities which can also extend, for example, to the 66 MHz band. In another aspect, the system 10 provides multi-vendor capabilities. For example, four, ten or as described below in connection with FIG. 3, sixteen frequencies that can be allocated among different vendors supplying energy management, minibar stocking and management, in-room safe units, employee tracking, and personnel locating services. The multiple frequencies can also permit faster response times by simultaneously scanning groups of AMSs 12 that operate at different frequencies within the same or different frequency bands.

Each AMS 12 includes a universal relay unit (URU) 20 that incorporates a satellite transceiver 22 and is interfaced to one or more appliance devices 24. Typical appliance devices are heating, ventilation and air conditioning units (HVAC) 25, temperature sensors 26, motion detectors 27, and door transducers 29. An ID card reader 28 for tracking employees and/or customer locations within the plant 11. When the building plant 11 is a hotel or motel, other appliances include room mini-bars 30, safes 31, and audio/video devices 32.

According to the present invention, at least some of the AMSs 12 are implemented as relay units whereby the HTU 18 and each of the satellite transceivers 22 is operable at low power and having a range that reaches only a portion of the plant 11, with communications beyond that range being effected by relay transmissions utilizing intermediate counterparts of the URU 20. More particularly, an exemplary configuration of the control system 10 is implemented with each of the URUs 20 therein having a unique identification or serial number, and the HCC 16 directing each wireless communication from the HTU 18 with a destination address corresponding to the serial number of a particular URU 20, and relay addresses, if necessary, corresponding to the serial numbers of other intermediately located URUs 20 such that the communication is chained with each link of the chain being within the limited range of the transceivers. In a preferred implementation, the ID tag IC produces a 5-character hexadecimal code.

As shown in FIG. 3, each URU 20 includes a microprocessor (MPU) 34 that is connected between the satellite transceiver 22 and the appliance devices 24. The MPU 34 is also connected to an ID tag IC 35 for secure and non-volatile storage of the unique serial number, a keypad 36 for operator input, a display device such as a liquid crystal display (LCD) 37, and a switch block 38. In an exemplary implementation, one pole of the switch block 38 provides a self test signal to the MPU 34, and four poles of the switch block 38 are connected to the satellite transceiver 22 for selecting one of 16 communication frequencies. It will be understood that the frequency selection can also be implemented by other means such as interface connections to the MPU 34 that are activated in response to local operator input and/or to the HCC 16. An alternative and preferred implementation has poles of the switch block 34 selecting channels of a spread spectrum frequency set that includes at least four frequencies (typically ten) and may include 20 or more frequencies using technology known to those having skill in the art. The preferred spread spectrum implementation of the transceivers 18 and 22 in the band of from 902 to 926 Mhz yields an effective range of 1000 feet at a power level of only 100 milliwatts. The actual wattage of the transceivers would typically be set by selection of components during assembly of the HTUs 18 and the satellite transceivers 22. The carrier frequency is selectively in a set of frequencies of one of preferably at least four communication channels, the four poles of the switch block 38 of FIG. 3 being capable of addressing sixteen channels.

As typically implemented the AMS 12 has the full functionality of a wall-mounted thermostat. Location and mounting of this device has the same considerations as a normal thermostat. It has controls and a display that are similar to a standard digital thermostat, and the connections for the heating and cooling units in the area are the same as a standard thermostat. This unit can control a heat pump device, or a gas fired device. The descriptions of the thermostat functions are as follows:

LCD Display. The LCD 37 is a general 16 character by 1 line LCD display module (backlighting optional), and functions as the general-purpose display of the AMS 12. The functions that it will serve for the thermostat are to display the air temperature, desired temperature, fan status, heating/cooling/OFF status, and whether a remote temperature override is active.

Temperature Sensor Thermistor. This device (26), along with the MPU 34, detects actual room temperature, being mounted in a well-ventilated corner of the AMS 12.

Four Button Control. These four buttons are the manual thermostat controls, and can be fully overridden by the remote HCS 14. The functions of the three buttons are: Temperature up; Temperature Down; Heating, Cooling, Off; and Fan Auto, Fan On always.

Heating and Cooling device controls and interface lines. There are small screw terminals provided for these interconnections, labeled with industry standard symbols recognized in the HVAC industry. There is also a jumper that will allow the AMS to be configured for a gas fired heating or a heat pump configuration.

In the exemplary implementation of FIG. 3, the URU 20 is powered from a source of low voltage (24V) AC that feeds a 5V DC power supply 39. An HVAC driver circuit 40 is also directly powered by the 24V AC for driving the HVAC appliances 25 in response to the MPU 34 using standard triac switch output connections G (Fan on/off control), Y1 ($1^{st}$ stage compressor cooling), Y2 ($2^{nd}$ stage compressor cooling), W1 ($1^{st}$ stage heating/or heat pump reversing valve control), and W2 ($2^{nd}$ stage heating). The door transducer 29 can be implemented with normally open and/or normally closed switch contacts and interfaced the MPU 34 using a 2-bit buffer 41. The mini bar 30 and/or the safe 31 can have a wireless interface to the URU 20 using an infrared transceiver 42 that is connected through a 6-bit buffer 43 to the MPU 34.

The temperature control operation of the ACS is as follows:

Normal LCD Display Information. When there is no activity on the ACS keypad or personal locator, the LCD 37 displays ambient and programmed temperatures. The measurement system of degrees C or F is determined at the HCS 14. If the thermostat is turned off the programmed temperature indication is OFF. If not OFF, there are prompts for a FAN indication of AUTOMATIC or ALWAYS ON, and a UNIT indication of COOLING, HEATING or OFF. An AUTO OVERRIDE indication shows whether the HCS has automatically overridden the local manual settings of the room temperature settings. This display will only show up if there is an auto override from the HCS (such as when the room is unoccupied) and it replaces the FAN display. Setting new room temperature. An occupant of the room can manually change the temperature by pressing either the temperature up or temperature down pushbutton. When the button is pressed the display will immediately change to the temperature setting display. The LCD temperature setting display indication flashes and changes appropriately, except that if the thermostat has been overridden by the HCS 14, then the display immediately displays AUTO OVERRIDE for 2 seconds before returning to the normal display mode. The flashing stops 5 seconds after the button was pressed last. The display will not switch to the FAN display mode during the temperature setting procedure. Setting Fan Control. When the occupant of the room desires to manually change the fan control function of the thermostat, they will press the "FAN" pushbutton. When the button is pressed the display will immediately change to Fan Operation setting display, with the LCD 37 appropriately indicating the mode of the fan depending on sequential pressings of the button and whether the thermostat has been overridden, the display reverting to normal after 2 seconds in that event. Heating/Cooling/OFF Control. The occupant of the room can manually change the heating/cooling/OFF function of the thermostat by pressing the "Heat/Cool/Off" pushbutton. When the button is pressed the display will immediately change to Fan Operation setting display, and the mode of the fan can be sequenced to HEATING, COOLING, and OFF, unless overridden as described above.

Generally, each URU 20 may have a subset of the elements described above in connection with FIG. 3. Most, if not all, of the URUs 20 will have at least one of the appliance devices 24 connected thereto in which case the URU 20 is in an AMS 12 as an appliance controller. In situations wherein the plant 11 does not include an appliance device 24 proximate a location that requires a relay transmission to one or more AMSs 12, a URU 20 at that location need not have an appliance device 24 connected thereto, that URU 20 functioning merely as a relay unit 20'. For example, FIG. 2 shows the plant 11 as a main three-story building 11A and a detached building 11B, and AMSs 12 connected as appliance controllers in a number of rooms of the plant 11. Also, a relay unit 20' is located in a hallway portion of the main building 11A. For the purposes of illustration, a relay communication path 44 extends from the HTU 18 by way of two AMSs 12 to the relay unit 20' and continuing to an additional AMS 12, the final AMS 12 in the path 44 being the destination of the communication path 44.

As further shown in FIG. 1, the AMS 12 may have additional communication paths to portable personal locator units including an active personal locator unit (APLU) 50 and a passive personal locator unit (PPLU) 52, the APLU 50 being battery powered and the PPLU 52 being unpowered. The PPLU 52 can be a magnetic device or a resonant circuit that interacts with the URU 20 when positioned at a distance on the order of 3 to 4 inches therefrom for signaling proximity of that particular PPLU 52. Thus the location of the PPLU 52 is inferred by its proximity to a particular one of the URUs 20. The APLU 50 can be implemented as a counterpart of the relay unit 20', but optionally without the ability to retransmit communications. Thus the APLU 50, which can be physically comparable in size to a conventional pager, is operationally effective whenever it is within range of the HTU 18 or a URU 20.

Preferably each communication from the HCS 14 through the HTU 18 results in a return trans mission confirming receipt of the prior communication by the destination AMS 12. Typically, and particularly in cases involving devices that are monitored but not controlled, the HTU 18 is periodically and sequentially activated with each and every destination address of the system 10, the monitoring being effected in the return communications from the respective destination AMS 12.

Figure 4:
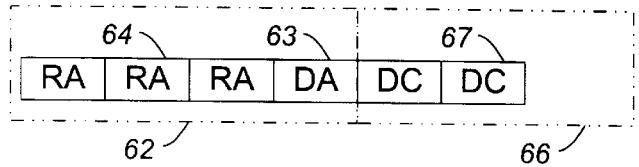
FIG. 4 is a command communication format diagram of the system of FIG. 1.

With further reference to FIG. 4, an exemplary command protocol 60 includes an address section 62 that includes a destination address 63 and may or may not include one or more relay addresses 64. Following the address section 62 is a command section 66 that includes one or more device commands 67, the device commands 67 being directed to particular ones of the appliance devices 24 at the destination AMS 12.

Figure 5:
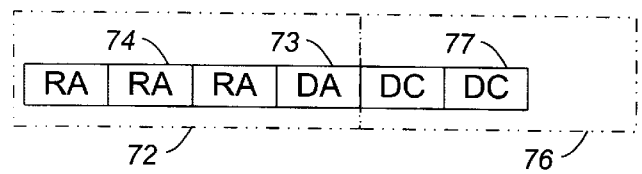
FIG. 5 is a return communication format diagram of the system of FIG. 1.

With further reference to FIG. 5, an exemplary return protocol 70 includes a counterpart of the address section, designated 72 that includes a destination address 73 and may or may not include one or more relay addresses 74. Following the address section 72 is a feedback section 76 that includes one or more feedback elements 77, the feedback elements 77 being responsive to particular ones of the appliance devices 24 at the destination AMS 12.

Figure 6:
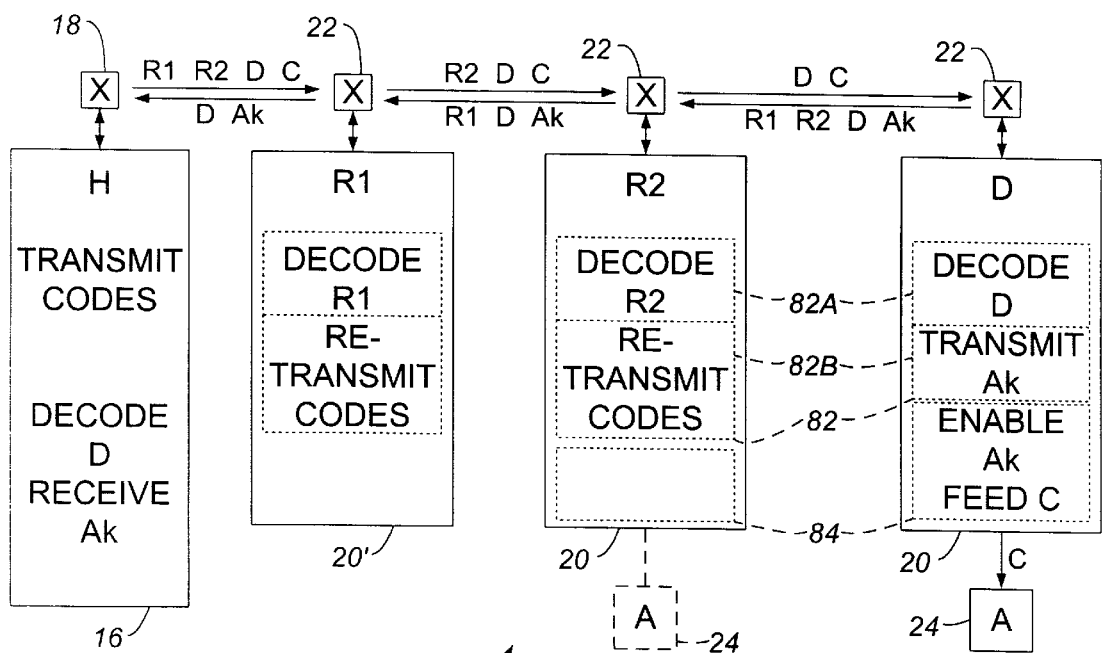
FIG. 6 is a pictorial diagram showing a process for using a portion of the system of FIG. 1.

Accordingly, and as shown in FIG. 6, the control system 10 of the present invention provides a process 80 for controlling a distributed array of appliances by the steps of signaling by the main transmitter from the headend computer H the addresses of at least three relay units, one of the addresses being a destination address D, the other addresses including first and second relay addresses R1 and R2, and a control signal C for an appliance A being interfaced to a destination relay unit D having a serial number corresponding to the destination address; decoding the first relay address at a first relay unit having a corresponding serial number; transmitting the control signal, the second relay address, and the destination address from the first relay unit; decoding the destination address at the destination relay unit; feeding the control signal to the appliance from the destination relay unit; transmitting the destination address, the first and second relay addresses, and an acknowledgment signal Ak from the destination relay unit; decoding the second relay address at the second relay unit; transmitting the acknowledgment signal, the first relay address, and the destination address from the second relay unit; and decoding the destination address and receiving the acknowledgment signal at the headend computer. In the process 80, the decoding and transmitting are effected by respective first and second instruction portions 82A and 82B of a relay program 82. Similarly, the feeding of the control signal to the appliance and generating the acknowledgment signal is effected by instructions of an appliance program 84, the programs 82 and 84 being resident in microcomputer memory of the URUs 20.

Accordingly, the control system 10 of the present invention provides a low cost, easy to install wireless solution for monitoring and controlling appliances of a hotel, commercial or residential building. The appliances include environmental control devices, occupancy detectors, personnel tracking locators, security video monitoring, and monitoring of amenities such as in-room safes and minibars. The limited transmission distances advantageously avoid requirements for governmental site licensing. The low power transceivers are inexpensive to provide, and are effective with transmission paths that must "bend" around objects that would normally block a line-of-sight RF broadcast, particularly in that multiple alternative paths using different ones of the URUs 20 are typically available. Installation merely requires locating the URUs 20 in rooms or areas having appliances to be controlled, connecting or otherwise arranging control paths form the URUs 20 to the appliances 24 in each AMS 12, and entering the serial numbers and locations of the URUs 20 into the HCC 16. The serial numbers can be entered automatically by sequentially activating (powering) the URUs 20, starting at locations within range of the HTU 18, while the HCS sequentially attempts to interrogate the entire range of serial numbers of the URUs 20 being installed. As each URU 20 is activated, its location is manually entered, being automatically associated with the just-received serial number not having been so associated. The HCC 16 automatically determines appropriate data path routes to each of the AMSs 12 and, in the event of a URU failure, the HCC 16 automatically reroutes the data paths 44 to bypass the failed unit. This is another important feature of the system 10 that is implemented by maintaining a complete message routing table that will determine the alternate communications path if any unit in the system fails to operate, also reporting the defective unit.

In an exemplary and preferred software implementation of the routing table, when enough AMS devices are installed (2 or more), the HCS 14 can be told to Auto-build the Message Routing Path Table. The HCS will then attempt to establish communication with each URU 20 that has been entered into it's database. This is done by first attempting to communicate with all of the URUs 20 that have been entered into the HCS database that are directly accessible from the HTS base station. All URUs that have been successfully communicated to are entered into the HTS database as a successful level 1 communications path.

Next, the HCS 14 will attempt to communicate with all of the URUs 20 that have been entered into the HCS database that are accessible from each of the level 1 URUs. All URUs that have been successfully communicated to are entered into the HTS database as a successful level 2 communications path. The HCS will then attempt to communicate with all of the URUs that have been entered into the HCS database that are accessible from each of the level 2 URUs, passing the message through the level 1 ACSs. All URUs that have been successfully communicated to are entered into the HTS database as a successful level 3 communications path.

The same procedure is followed in levels 4–8 as in level 3, except there is an additional link or "hop" the communications must make for each of the levels 4 through 8. In an exemplary implementation, the HCS 14 automatically builds the Message Routing Path Table to a maximum number of 8 links or "hops", but supports up to a maximum of 16 "hops", the additional ones being entered manually. At any time during the normal HTS operation, the operator can order a report that specifies which ACSs are not communicating correctly with the HCS. The report indicates whether the unit never worked or has recently failed. A recently failed unit normally requires replacement; a unit that never worked requires either replacement or another URU between it and an operating URU to act as a repeater. After initial installation, URUs 20 can be added manually, or the Auto-building of the Message Routing Path Table can be run again.

In residential applications, the system 10 provides a child tracking system for monitoring the locations of children anywhere within the neighborhood of the HTU 18 and any of the URUs 20 operating therewith. Thus the system 10 can combine the child tracking feature with energy management controls and security monitoring as described above Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. An appliance controller for a distributed appliance system having a headend computer, a multiplicity of appliances, and a plurality of relay units, one of the relay units being the appliance controller and comprising:
    (a) a low power satellite radio transceiver having a range being less than a distance to at least some of the appliances;
    (b) an appliance interface for communicating with the at least one local appliance;
    (c) a microcomputer connected between the satellite radio transceiver and the appliance interface and having first program instructions for controlling the satellite transceiver and second program instructions for directing communication between the satellite transceiver and the appliance interface;
    (d) the first program instructions including detecting communications directed by the headend computer relative to the same appliance controller, signaling receipt of the directed communications, and directing communications to the headend computer relative to the same appliance controller; and
    (e) the second program instructions including detecting relay communications directed between the headend computer and a different relay unit, transmitting the relay communications, detecting a reply communication from the different relay unit, and transmitting the reply communication to the headend computer,
    wherein at least some of the relay units communicate with the headend computer by relay communications using at least two others of the relay units.

2. The appliance controller of claim 1, wherein each of the relay units has a unique address associated therewith, and each communication from the headend computer to the appliance controller includes an address code corresponding to the unique address being selectively a relay address for communications being relayed to other relay units, the address code being a destination address when the appliance controller is the destination of the communication, the appliance controller including means for decoding the address code.

3. The system of claim 1, wherein each of the transceivers has an effective range to another of the relay units being not less than 50 feet and not more than 1 mile.

4. The system of claim 1, wherein the satellite radio transceiver has a carrier frequency of between 66 KHz and 2.6 GHz.

5. The system of claim 4, wherein the carrier frequency is selectively one of at least four frequencies.

6. The system of claim 4, wherein the carrier frequency is selectively in a set of frequencies of one of at least four communication channels.

7. A system for controlling a distributed array of appliances, comprising:
    (a) a headend computer having a low power main radio transceiver interfaced thereto, the main radio transceiver having a range being less than a distance to at least some of the appliances; and
    (b) a distributed array of relay units, each relay unit comprising:
        (i) a low power satellite radio transceiver having a range being less than the distance to at least some of the appliances;
        (ii) a microcomputer connected to the satellite radio transceiver and relay program instructions for controlling the satellite transceiver;
        (iii) The relay program instructions including first instructions for detecting communications directed by the headend computer relative to the same relay unit and directing communications to the headend computer relative to the same relay unit, and second instructions for retransmitting communications to other relay units;
    (c) at least some of the relay units being appliance controllers, each of the appliance controllers being located proximate at least one of the appliances and further comprising:
        (i) an appliance interface for communicating with the at least one appliance; and
        (ii) the microcomputer being also connected to the appliance interface and having destination program instructions for directing communication between the satellite transceiver and the appliance interface,
    wherein at least some of the appliance controllers communicate with the headend computer by relay communications using at least two others of the relay units.

8. The system of claim 7, wherein each of the relay units has a unique address associated therewith and means for detecting occurrences of the unique address in communications from the headend computer, and each communication from the headend computer to an appliance controller includes a destination address being the address of that appliance controller and selectively includes one or more relay addresses being the addresses of relay units to repeat the communication.

9. The system of claim 7, wherein each of the transceivers has an effective range of not less than 50 feet and not more than 1 mile to another of the transceivers.

10. The system of claim 9, wherein each of the transceivers operates at a frequency of between 900 MHz and 1.0 GHz, and has an effective range of not less than 50 feet and not greater than approximately 1000 feet.

11. The system of claim 9, wherein each of the transceivers operates at a frequency of between 2.4 GHz and 2.6 GHz, and has an effective range of not less than 1,000 feet and not greater than approximately 1 mile.

12. The system of claim 9, wherein each of the transceivers transmits at a power not greater than 100 milliwatts.

13. The system of claim 7, wherein the satellite radio transceiver has a carrier frequency of between 66 KHz and 2.6 GHz.

14. The system of claim 13, wherein the carrier frequency is selectively one of at least four frequencies.

15. The system of claim 13, wherein the carrier frequency is selectively in a set of frequencies of one of at least four communication channels.

16. A method for controlling a distributed array of appliances from a headend computer, comprising the steps of:

(a) providing a headend computer having a main radio transceiver;

(b) providing a distributed array of relay units, each relay unit having a satellite radio transceiver and a unique serial number, at least some of the relay units being electrically interfaced to a corresponding portion of the appliances;

(c) signaling by the main transmitter from the headend computer the addresses of at least three relay units, one of the addresses being a destination address, the other addresses including first and second relay addresses, and a control signal for an appliance being interfaced to a destination relay unit having a serial number corresponding to the destination address;

(d) decoding the first relay address at a first relay unit having a corresponding serial number;

(e) transmitting the control signal, the second relay address, and the destination address from the first relay unit;

(f) decoding the destination address at the destination relay unit; and (g) feeding the control signal to the appliance from the destination relay unit.

17. The method of claim 16, comprising the further steps of:

(a) transmitting the destination address, the first and second relay addresses, and an acknowledgment signal from the destination relay unit;

(b) decoding the second relay address at the second relay unit;

(c) transmitting the acknowledgement signal, the first relay address, and the destination address from the second relay unit;

(d) decoding the destination address and receiving the acknowledgement signal at the headend computer.

* * * * *